DIXON & CLOSE.
Gate.
No. 56,019. Patented July 3, 1866.
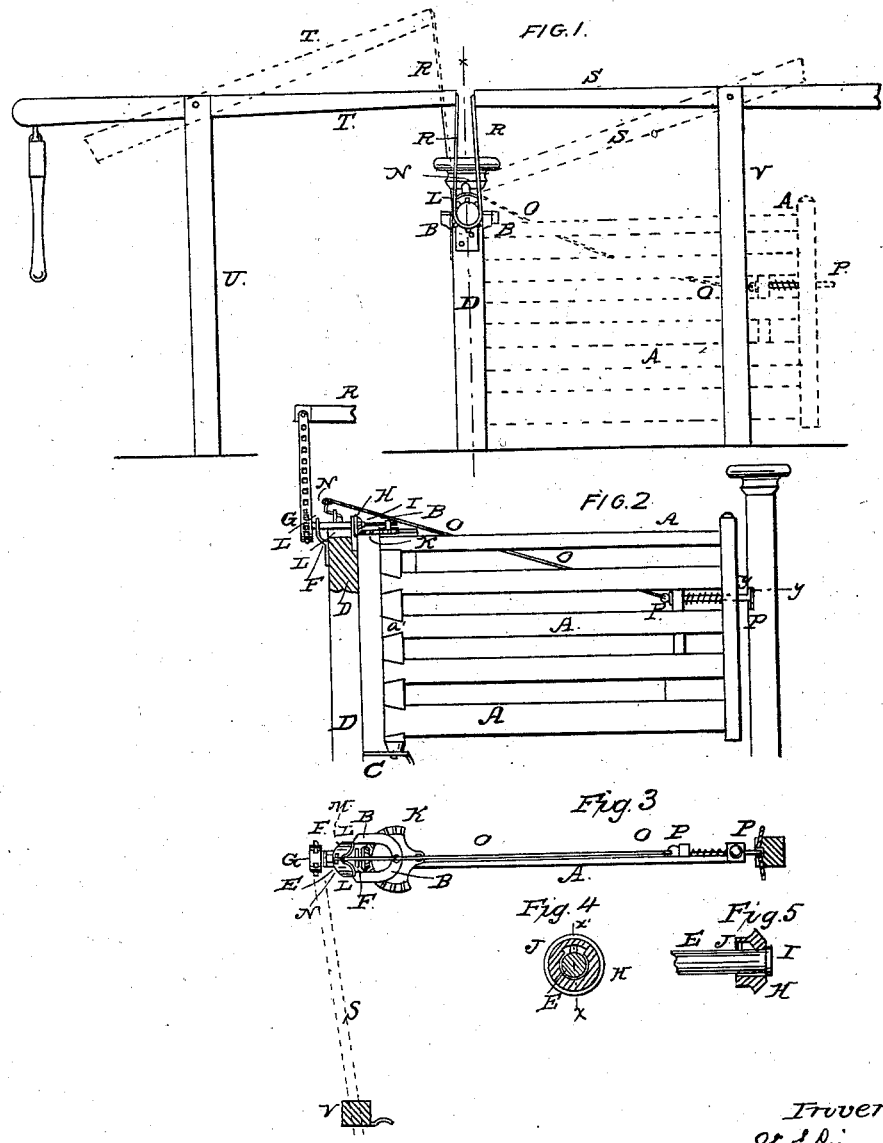

UNITED STATES PATENT OFFICE.

CHAS. DIXON AND S. H. CLOSE, OF PORT BYRON, NEW YORK.

IMPROVEMENT IN GATES.

Specification forming part of Letters Patent No. 56,019, dated July 3, 1866.

*To all whom it may concern:*

Be it known that we, CHARLES DIXON and S. H. CLOSE, of Port Byron, Cayuga county, State of New York, have invented a new and useful Improvement in Gates; and we do hereby declare that the following is a full, clear, and exact description thereof, which will enable others skilled in the art to make and use the same, reference being had to the accompanying drawings, forming part of this specification, in which—

Figure 1 is a rear-edge view of our improved gate, and showing in red the position of the parts when the gate is open. Fig. 2 is a side view of the same, partly in section, through the line $xx$, Fig. 1. Fig. 3 is a top view of the same, partly in section, through the line $yy$, Fig. 2. Fig. 4 is a detail sectional view taken through the line $zz$, Fig. 2. Fig. 5 is a detail sectional view taken through the line $x'x'$, Fig. 4.

Similar letters of reference indicate like parts.

Our invention has for its object to furnish an improved gate which may be conveniently opened and closed without descending from the carriage; and it consists, first, in the gearing by means of which the gate is swung open and shut, consisting of the spur-wheel, shaft, and bevel-gear wheels, in combination with each other, with the gate-post, and with the rear upright of the gate; second, in the combination of the levers and connecting-chain with each other and with the spur-wheel of the gearing; third, in the device for unfastening the gate before the bevel-gears operate to swing it, as hereinafter more fully described.

A is the gate, about the construction of which there is nothing new. This gate is pivoted to ears B and C, attached to the top and lower parts of the gate-post D, as shown in Figs. 2 and 3.

E is a short shaft supported by and working in bearings F, attached to the top of the gate-post D, as shown in Fig. 2.

G is a spur-wheel securely attached to or formed solid with the shaft E, by means of which motion is communicated to the said shaft E. Upon the forward end of the shaft E is placed a bevel-gear wheel, H, which is kept in place upon the end of the shaft by a screw, I.

The gear-wheel H is made to revolve with the shaft E by means of a pin or projection, J, projecting from the side of the shaft E, as shown in the drawings. This pin or projection enters and works in a slot formed in the interior of the bevel-wheel H, as shown in Figs. 4 and 5. This slot is of such a length that the shaft E can revolve a short distance in both directions before the projection J comes in contact with the side of the said slot and revolves the said gear-wheel.

The gear-wheel H meshes into a bevel-gear wheel, or portion of a bevel-gear wheel, K, attached to the top of the rear upright, $a'$, of the gate A, as shown in Figs. 2 and 3, so that as the gear-wheel H is revolved in one direction the gate A is opened in one direction, and as the said gear-wheel is revolved in the other direction the gate also is swung in the opposite direction.

L is a band, the ends of which are pivoted to the sides of the upper end of the post D, as shown in Figs. 2 and 3, upon the forward edge of which is formed a double inclined plane. In the notch formed by the meeting of these inclined planes rests, when the gate is closed, the upper end of the pin M, which is inserted in and projects from the side of the shaft E.

Upon the upper side of the band L is formed an ear, N, to which is pivoted the end of the wire or rod O, the other end of which is attached to the rear end of the bolt P, as shown in Figs. 1, 2, and 3. As the shaft E is revolved in either direction the pin M, by pressing against the inclined edge of the band L, forces the said band back, carrying with it the rod O and bolt P, thus unfastening the gate. By the time the bolt P has been drawn back the pin J reaches the side of the slot in the gear-wheel H, and revolves it, thereby opening the gate.

R is a strap, having holes through it fitting upon the spurs of the spur-wheel G; but we prefer to use a chain the links of which are so formed as to take hold of and operate the spur-wheel G. This band or chain R passes around the spur-wheel G, and its ends are attached to the ends of the levers S and T. These levers are pivoted to the posts U and V, and are of such a length that the driver, after passing through the gateway, can close the gate without its coming in contact with the carriage in which he sits, the gate always opening from the operator.

The gate is held open by a spring-catch, W, one of which is attached to each of the posts U and V.

X is a spring attached to the bolt P, which forces the said bolt forward as soon as the pin M is released from the band L, making the gate self-closing.

We claim as new and desire to secure by Letters Patent—

1. The spur-wheel G, shaft E, and bevel-gear wheels H and K, constructed and arranged as described, in combination with each other, with the gate-post D, and with the rear upright bar, $a'$, of the gate A, substantially as described, and for the purpose set forth.

2. The combination of the levers S and T and band or chain R with each other and with the spur-wheel G, substantially as described, and for the purpose set forth.

3. The combination of the pin M, band L, and rod O with each other and with the shaft E and bolt P, substantially as described, and for the purpose set forth.

4. The combination of the pin J with the shaft E and gear-wheel H, substantially as described, and for the purpose set forth.

CHARLES DIXON.
S. H. CLOSE.

Witnesses:
Z. PITCHER,
J. H. WETHEY.